US008017660B2

(12) United States Patent
Sun

(10) Patent No.: US 8,017,660 B2
(45) Date of Patent: Sep. 13, 2011

(54) PROCESS FOR DISSOLUTION OF HIGHLY FLUORINATED ION-EXCHANGE POLYMERS

(75) Inventor: Qun Sun, Wilmington, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 689 days.

(21) Appl. No.: 12/037,264

(22) Filed: Feb. 26, 2008

(65) Prior Publication Data

US 2008/0214684 A1 Sep. 4, 2008

Related U.S. Application Data

(63) Continuation of application No. 11/050,194, filed on Feb. 3, 2005, now abandoned, which is a continuation of application No. 10/194,491, filed on Jul. 12, 2002, now abandoned.

(60) Provisional application No. 60/305,129, filed on Jul. 13, 2001.

(51) Int. Cl.
*C08J 5/20* (2006.01)

(52) U.S. Cl. ............ 521/25; 521/27; 524/111; 524/113; 524/545; 524/546

(58) Field of Classification Search .................... 521/25, 521/27; 524/111, 113, 545, 546
See application file for complete search history.

(56) References Cited

U.S. PATENT DOCUMENTS

| 3,282,875 | A | | 11/1966 | Connolly et al. | |
|---|---|---|---|---|---|
| 4,358,545 | A | | 11/1982 | Ezzell et al. | |
| 4,433,082 | A | * | 2/1984 | Grot .............................. | 524/544 |
| 4,808,651 | A | * | 2/1989 | Blickle et al. ................. | 524/366 |
| 4,940,525 | A | | 7/1990 | Ezzell et al. | |
| 5,539,002 | A | | 7/1996 | Watanabe | |
| 5,547,551 | A | * | 8/1996 | Bahar et al. ................... | 204/296 |
| 5,824,622 | A | * | 10/1998 | Harmer et al. ................ | 502/407 |
| 6,034,290 | A | | 3/2000 | Harmer et al. | |
| 6,150,426 | A | | 11/2000 | Curtin et al. | |
| 6,218,460 | B1 | * | 4/2001 | Shin et al. ..................... | 524/546 |

FOREIGN PATENT DOCUMENTS

| EP | 1 026 152 A1 | | 3/1998 |
|---|---|---|---|
| GB | 1547534 | | 6/1979 |
| JP | 11-288732 | | 10/1999 |
| WO | WO-03-006537 A1 | * | 1/2003 |

* cited by examiner

*Primary Examiner* — Peter D. Mulcahy
*Assistant Examiner* — Henry Hu

(57) ABSTRACT

Highly fluorinated ion-exchange polymers achieve dissolution in aqueous tetrahydrofuran at lower pressures and temperatures than in other solvents, with few or no side products being formed.

10 Claims, No Drawings

US 8,017,660 B2

PROCESS FOR DISSOLUTION OF HIGHLY FLUORINATED ION-EXCHANGE POLYMERS

FIELD OF THE INVENTION

This invention is in the field of liquid compositions of highly fluorinated ion-exchange polymer.

BACKGROUND OF THE INVENTION

Highly fluorinated ion-exchange polymers, such as the sulfonyl type disclosed in U.S. Pat. No. 3,282,875, are used in membrane form as separators in electrochemical cells. The polymers are also useful as acid catalysts. These applications first used melt-fabricated, i.e. melt-processed, shapes such as films and pellets. Because the ion-exchange polymers are difficult to melt-process in the ionic form, fabrication is carried out on polymer in a melt-processible precursor form, and the fabricated article is then hydrolyzed to convert the polymer to the ionic (also referred to as the ion-exchange) form. Later, methods were discovered for making liquid compositions of highly fluorinated ion-exchange polymers: U.S. Pat. Nos. 4,433,082 and 6,150,426. From such liquid compositions, ion-exchange membranes can be made by film-casting techniques. Catalyst can be made by coating liquid compositions on inert substrates. Liquid compositions have also found use in making electrodes for fuel cells.

Dissolution of the above polymers in their ionic forms requires solvents and temperatures sufficient to overcome the forces that hold the polymer together in the solid state. These forces include the polar attractions of the ionic groups for one another. Polar solvents such as water and alcohol can solvate the ionic groups of the polymer, weakening their interaction, and promoting dissolution. Heat further weakens intermolecular attractions.

Liquid compositions are typically made by putting highly fluorinated ion-exchange polymer that is in the sulfonic acid form, in alcohol, in water, or in aqueous alcohol, and heating the combination to achieve the dissolution of the polymer. The temperatures necessary are generally 220° C. or higher. These temperatures are above the boiling point of the solvent at atmospheric pressure and therefore the dissolution is conducted in an autoclave. Higher temperatures are necessary with water. Alcohol is a better solvent, and lower temperatures can be used. However, the formation of side products such as ether and olefin through the reaction of the alcohol with the strongly acid polymer contributes to the development of pressure during dissolution. Water-alcohol, i.e. aqueous alcohol, is effective at lower temperatures than are necessary with water alone, and also does not develop pressures so high as occur with alcohol alone. Nevertheless, though reduced in quantity, side products still form, adding to reaction pressure, requiring separation from the liquid composition and disposal, and resulting in loss of solvent. New solvents are needed that are effective at lower temperatures and that produce less side product.

SUMMARY OF THE INVENTION

A process for making a liquid composition of highly fluorinated ion-exchange polymer comprising
a) contacting the polymer with aqueous tetrahydrofuran, and
b) heating said polymer in contact with aqueous tetrahydrofuran to form the liquid composition.

The invention further provides a liquid composition of highly fluorinated ion-exchange polymer in aqueous tetrahydrofuran.

DETAILED DESCRIPTION

Polymers for use in accordance with the present invention are highly fluorinated ion-exchange polymers having sulfonate functional groups. "Highly fluorinated" means that at least about 50% of the total number of halogen and hydrogen atoms in the polymer are fluorine atoms, preferably at least about 75%, and more preferably at least about 90%. Most preferably, the polymer is perfluorinated. The term "sulfonate functional group" refers to either to sulfonic acid groups or salts of sulfonic acid groups, preferably alkali metal or ammonium salts. The functional group is represented by the formula $-SO_3X$ where X is a cation, also known as a "counterion". X may be H, Li, Na, K or $N(R_1)(R_2)(R_3)(R_4)$, and $R_1$, $R_2$, $R_3$, and $R_4$ are the same or different and are preferably H, $CH_3$ or $C_2H_5$. More preferably, X is H, in which case the polymer is said to be in the "acid form". X may also be multivalent, as represented by such ions as $Ca^{++}$, and $Al^{+++}$. It is clear to the skilled artisan that in the case of multivalent counterions, represented generally as $M^{n+}$, the number of sulfonate functional groups per counterion will be equal to the valence "n".

Preferably, the polymer comprises a polymer backbone with recurring side chains attached to the backbone, the side chains carrying cation exchange groups. Polymers include homopolymers or copolymers of two or more monomers. Copolymers are typically formed from a nonfunctional monomer and a second monomer carrying the cation exchange group or its precursor, e.g., a sulfonyl fluoride group ($-SO_2F$), which can be subsequently hydrolyzed to a sulfonate functional group. For example, copolymers of a first fluorinated vinyl monomer together with a second fluorinated vinyl monomer having a sulfonyl fluoride group ($-SO_2F$) can be used. Possible first monomers include tetrafluoroethylene (TFE), hexafluoropropylene, vinyl fluoride, vinylidine fluoride, trifluoroethylene, chlorotrifluoroethylene, perfluoro (alkyl vinyl ether), and combinations thereof. TFE is a preferred first monomer.

Possible second monomers include fluorinated vinyl ethers with sulfonate functional groups or precursor groups which can provide the desired side chain in the polymer. Additional monomers, including ethylene, propylene, and $R-CH=CH_2$ where R is a perfluorinated alkyl group of 1 to 10 carbon atoms, can be incorporated into these polymers if desired. The polymers may be of the type referred to herein as random copolymers, that is copolymers made by polymerization in which the relative concentrations of the comonomers are kept as constant as possible, so that the distribution of the monomer units along the polymer chain is in accordance with their relative concentrations and relative reactivities. Less random copolymers, made by varying relative concentrations of monomers in the course of the polymerization, may also be used. Polymers of the type called block copolymers, such as that disclosed in European Patent Application No. 1,026,152 A1, may also be used.

Preferred polymers for use in the present invention include a highly fluorinated, most preferably perfluorinated, carbon backbone and side chains represented by the formula

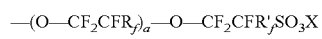

wherein Rf and R'f are independently selected from F, Cl or a perfluorinated alkyl group having 1 to 10 carbon atoms, a=0, 1 or 2, and X is H, Li, Na, K or N(R1)(R2)(R3)(R4) and R1, R2, R3, and R4 are the same or different and are preferably H, $CH_3$ or $C_2H_5$. More preferably X is H. As stated above, X may also be multivalent.

The preferred polymers include, for example, polymers disclosed in U.S. Pat. No. 3,282,875 and in U.S. Pat. Nos. 4,358,545 and 4,940,525. An example of preferred polymer comprises a perfluorocarbon backbone and the side chain represented by the formula

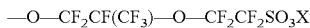

where X is as defined above. Polymers of this type are disclosed in U.S. Pat. No. 3,282,875 and can be made by copolymerization of tetrafluoroethylene (TFE) and the perfluorinated vinyl ether $CF_2$=CF—O—$CF_2CF(CF_3)$—O—$CF_2CF_2SO_2F$, perfluoro(3,6-dioxa-4-methyl-7-octenesulfonyl fluoride) (PDMOF), followed by conversion to sulfonate groups by hydrolysis of the sulfonyl fluoride groups and ion exchanged as necessary to convert them to the desired ionic form. An example of a preferred polymer of the type disclosed in U.S. Pat. Nos. 4,358,545 and 4,940,525 has the side chain —O—$CF_2CF_2SO_3X$, wherein X is as defined above. This polymer can be made by copolymerization of tetrafluoroethylene (TFE) and the perfluorinated vinyl ether $CF_2$=CF—O—$CF_2CF_2SO_2F$, perfluoro(3-oxa-4-pentene-sulfonyl fluoride) (POPF), followed by hydrolysis and further ion exchange as necessary.

The polymers of this invention preferably have an ion exchange ratio of less than about 33. In this application, "ion exchange ratio" or "IXR" is defined as number of carbon atoms in the polymer backbone in relation to the cation exchange groups. Within the range of less than about 33, IXR can be varied as desired for the particular application. With most polymers, the IXR is preferably about 3 to about 33, more preferably about 8 to about 23.

The cation exchange capacity of a polymer is often expressed in terms of equivalent weight (EW). For the purposes of this application, equivalent weight (EW) is defined to be the weight of the polymer in acid form required to neutralize one equivalent of sodium hydroxide. In the case of a sulfonate polymer where the polymer has a perfluorocarbon backbone and the side chain is —O—$CF_2$—$CF(CF_3)$—O—$CF_2$—$CF_2$—$SO_3H$ (or a salt thereof, the equivalent weight range which corresponds to an IXR of about 8 to about 23 is about 750 EW to about 1500 EW. IXR for this polymer can be related to equivalent weight using the formula: 50 IXR+344=EW. While the same IXR range is used for sulfonate polymers disclosed in U.S. Pat. Nos. 4,358,545 and 4,940,525, e.g., the polymer having the side chain —O—$CF_2CF_2SO_3H$ (or a salt thereof, the equivalent weight is somewhat lower because of the lower molecular weight of the monomer unit containing a cation exchange group. For the preferred IXR range of about 8 to about 23, the corresponding equivalent weight range is about 575 EW to about 1325 EW. IXR for this polymer can be related to equivalent weight using the formula: 50 IXR+178=EW.

Temperatures for use in the process can be within the range of about 150° C. to about 300° C. It has been discovered that with aqueous tetrahydrofuran, the dissolution of highly fluorinated ion-exchange polymer can be achieved at lower temperature and pressure than with known solvents. It will be recognized by those skilled in the art of making such liquid compositions, that the IXR of the polymer affects the temperature required. The higher the IXR, the lower the concentration of the ion-exchange groups in polymer, and the greater the crystallinity due to the greater tetrafluoroethylene content. Other things being equal, higher temperatures are necessary to achieve the dissolution of higher IXR polymers. In the case of polymer of IXR=14.3 in the acid form using aqueous THF solvent, temperatures of 160° C. to 260° C. are effective, temperatures of 180° C. to 240° C. are preferred, and temperatures of 190° C. to 220° C. are more preferred.

In the water plus THF combinations referred to herein under the general term "aqueous THF" or "aqueous tetrahydrofuran" the water:tetrahydrofuran ratio, on a weight basis, is about 1:99 to about 99:1. For rapid dissolution at minimum temperature and pressure, the water:tetrahydrofuran ratio is preferably about 10:90 to about 90:10, more preferably about 20:80 to about 80:20, still more preferably about 40:60 to about 60:40, and most preferably about 45:55 to about 55:45. However, it is found that higher solids are attainable while maintaining the liquid composition in a pourable state if tetrahydrofuran (THF) is <50 wt % of the solvent. If the desire for higher solids liquid compositions takes precedence over lower dissolution temperatures and pressures, the preferred water:THF ratio is about 50:50 to about 99:1, more preferably about 50:50 to about 90:10, still more preferably about 50:50 to about 75:25, and most preferably about 50:50 to about 60:40.

The acid form and the sodium ion and potassium ion forms and combination thereof, are preferred forms of the highly fluorinated ion-exchange polymer for making solution. The sodium and potassium ion forms and other ionic forms can be made according to the teachings of this invention, following substantially the same procedure as used for the acid form. The acid form is the most preferred form of the polymer for use in making solution since it is desirable for most applications that the polymer in the resulting solution be in acid form. Starting with the acid form avoids a subsequent acid exchange process step. Somewhat higher temperatures are necessary when the sodium and potassium forms are used instead of the acid form.

A further surprising aspect of this invention is that after heating to achieve the dissolution of the polymer in aqueous THF, little or no ether, olefin, or other organic product of the reaction of the THF with the acid polymer is found. Because of the absence of these volatile side products, the pressures developed during dissolution are much lower, which reduces the cost of the equipment used in making the polymer liquid composition and makes for a more easily run reaction. Because little or no side products form, the resulting polymer liquid composition is preferably substantially free of side products. By "substantially free" is meant that the polymer liquid composition contains less than about 3 weight %, preferably 1 weight % organic materials other than THF and those associated with the polymer. The resulting polymer liquid composition need not be further treated to remove the side products, which are impurities. As a result, substantially all the solvent may be recovered and used again. THF recovery is facilitated by the fact that it forms an azeotrope with water (boiling point 64° C., 95:5 wt:wt THF:water at atmospheric pressure).

The solids concentration in the liquid compositions of this invention are preferably about 1 to about 15 wt %, more preferably about 5 to about 12 wt %, and most preferably about 6 to about 10 wt %. As solids concentration increases, viscosity rises until the liquid composition is not pourable and takes on the character of a gel. The practical solids limit is determined by the viscosity that can be tolerated. Temperature enters into this because if the liquid composition can be kept at higher temperature, or if it is used as soon as it is made, higher solids liquid compositions are acceptable.

The liquid compositions of this invention can be made in any vessel rated for the pressures encountered at the temperatures used to achieve dissolution. The material of construction of the vessel should have corrosion resistance, such as is provided by nickel alloys such as Hastelloy-C. Dissolution will occur if the vessel containing the polymer and aqueous THF is simply heated for a sufficient time. Agitation however, is preferred to reduce the time needed for dissolution of the polymer in aqueous THF. Agitation may be accomplished by imparting motion to the vessel itself, preferably by shaking or rocking. Alternatively and preferably, the contents alone may be agitated through use of a vessel having an agitator to stir or mix the polymer and aqueous THF.

EXAMPLES

The perfluorinated ion-exchange polymer used is Nafion® perfluorinated sulfonic acid polymer made by the DuPont Company, Wilmington Del. USA. The equivalent weight of the polymer is 1060 (IXR=14.3). The polymer is available from Aldrich Chemical Co. Milwaukee Wis. USA. The solvents, THF and methanol, are reagent grade. Distilled water is used.

The reactor used for dissolving the Nafion® resin in THF/water solution is a 300 ml vertical stirred autoclave from Autoclave Engineers (Erie Pa. USA). The reactor is made of Hastelloy-C. It can be operated up to 3000 psi (20 MPa). Typically, it takes about 30 minutes to heat the autoclave from room temperature to 180° C.

Example 1

The 300 ml autoclave is charged with 16 g perfluorinated ion-exchange polymer pellets (approximately cylindrical, 1 mm×1 mm), 92 g distilled water and 92 g reagent grade THF. The charge consists of 8 wt % polymer. The autoclave is heated to 190° C. in 30 minutes with agitation speed set at 1000 rpm. The pressure in the autoclave is 310 psi (2.1 MPa). After 4 hours heating and agitation the autoclave is cooled to room temperature. The autoclave pressure is zero (gauge), indicating no formation of side products such as ethers or olefins that exert vapor pressure over and above that of the THF:water solution at room temperature. On draining, the autoclave is found to contain only liquid, a homogenous liquid composition of the perfluorinated ion-exchange polymer. No second layer of liquid is seen, further indication that no side product ethers are formed. The absence of solids shows that dissolution of the polymer pellets is complete.

Example 2

The 300 ml autoclave is charged with 16 g perfluorinated ion-exchange polymer, 92 g distilled water and 92 g THF. The mixture is heated to 200° C. after 35 minutes at the agitation speed of 1500 rpm. The autoclave pressure is 370 psi (2.6 MPa) at 200° C. Heating and agitation is continued for an additional 4 hours. After cooling to room temperature, the autoclave is drained and found to contain a homogenous liquid composition of the perfluorinated ion-exchange polymer.

Comparative Example

For comparison, perfluorinated ion-exchange polymer liquid composition is made according to the general teaching of U.S. Pat. No. 4,433,082, Example 11. The autoclave is charged with 17 g perfluorinated ion-exchange polymer, 23 g methanol, 50 g n-propanol, and 100 g distilled water. It is heated to 230° C. and with mechanical agitation for 3 hours. The autoclave pressure is 1000-1100 psi (6.9-7.6 MPa). After cooling to room temperature, some pressure remains and is vented. The liquid obtained separates into two layers. The upper layer, composed largely of ethers, is about 10% by volume of the total amount of liquid. This example shows that, compared to the process of this invention, the use of aqueous alcohol to achieve dissolution of perfluorinated ion-exchange polymer generates 3-4 fold higher pressures and significant volumes of solvent side products.

What is claimed is:

1. A process for making a liquid composition of ion-exchange polymer, at least about 50% of the total number of halogen and hydrogen atoms in said ion-exchange polymer being fluorine atoms, said process comprising:
    a) contacting the polymer in the solid state with aqueous tetrahydrofuran, said aqueous tetrahydrofuran being comprised of water and tetrahydrofuran in a ratio of about 10:90 to about 90:10 weight %, and
    b) heating said polymer in contact with aqueous tetrahydrofuran to a temperature of about 150° C. to about 300° C., in a vessel rated for the pressures encountered at these temperatures, to form the liquid composition, said liquid composition formed from said contacting and said heating containing less than about 3 weight % organic materials other than said tetrahydrofuran and those associated with said ion exchange polymer.

2. The process of claim 1 wherein said aqueous tetrahydrofuran is comprised of water and tetrahydrofuran in a ratio of about 45:55 to about 55:45 weight %.

3. The process of claim 1 wherein said aqueous tetrahydrofuran is comprised of less than about 50 weight % tetrahydrofuran.

4. The process of claim 1 wherein the polymer comprises about 1 to about 15 weight % of the combined weight of polymer and water and tetrahydrofuran.

5. The process of claim 1 wherein said polymer in contact with aqueous tetrahydrofuran is heated in an autoclave.

6. The process of claim 1 wherein said ion-exchange polymer is in the acid form, sodium ion form or potassium ion form, or a combination thereof.

7. The process of claim 1 wherein said ion-exchange polymer is in the acid form.

8. The process of claim 1 wherein said ion-exchange polymer is perfluorinated.

9. The process of claim 1 wherein said ion-exchange polymer has an ion-exchange ratio of about 3 to about 33.

10. The process of claim 1 wherein said ion-exchange polymer has an ion-exchange ratio of about 8 to about 23.

* * * * *